Jan. 22, 1963
G. W. M. LUSH ET AL
3,074,708
VEHICLE SUSPENSION
Filed Oct. 31, 1960
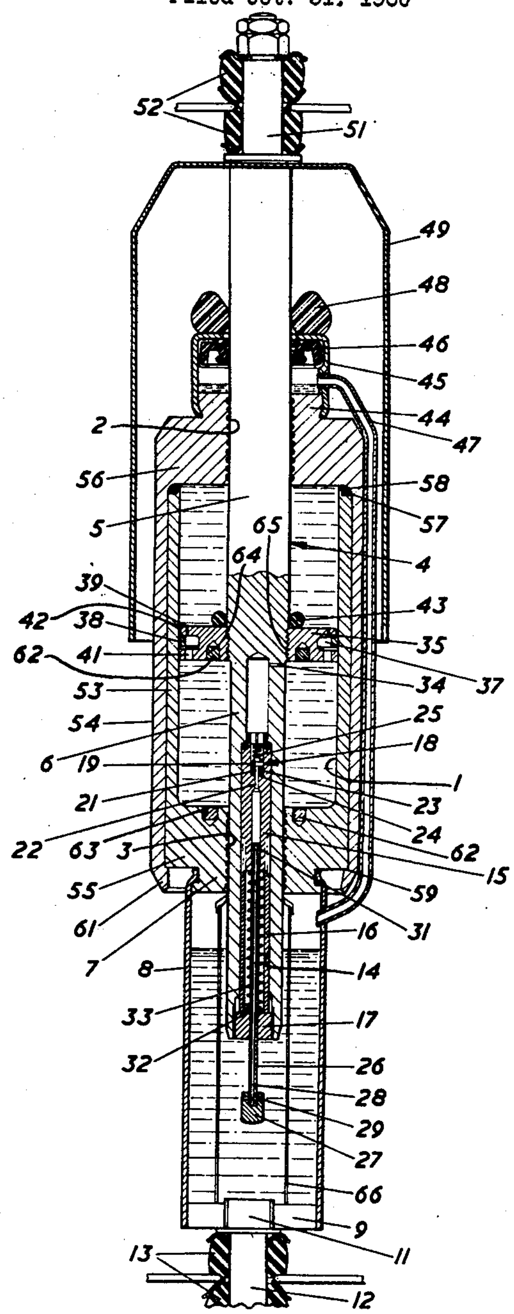
INVENTORS
GERALD W. M. LUSH
PETER G. C. WHITTALL
BY Reynolds & Christensen
ATTORNEYS

United States Patent Office 3,074,708

Patented Jan. 22, 1963

3,074,708

VEHICLE SUSPENSION

Gerald W. M. Lush, Gaydon, and Peter G. C. Whittall, Bishops Cleeve, England, assignors to Dowty Technical Developments Limited, Gloucestershire, England, a British company Filed Oct. 31, 1960, Ser. No. 66,198
Claims priority, application Great Britain Nov. 2, 1959
7 Claims. (Cl. 267—64)

This invention relates to vehicle suspensions. The main object of this invention is to provide a compact suspension unit for use on motor vehicles. A further object is to provide such a compact suspension unit which is self-adjusting during motion of the vehicle to extend to substantially a predetermined height irrespective of the load carried by the vehicle.

In accordance with the present invention, a suspension unit for a vehicle comprises a pressure container, a plunger device extending through the container, a pair of high pressure seals within the container engaging the plunger device and defining between them an annular liquid filled space, the plunger device having differing cross-sectional areas at the two seals so that longitudinal movement of the plunger within the container varies the effective volume within the container, a liquid reservoir extending from the container to enclose one end of the plunger device extending from the container, a passage for leakage flow from the container to the reservoir, and a pump operatively connected between the plunger device and the container to pump liquid from the reservoir to the container on reciprocation of the plunger within the container. The container may comprise a thick walled cylinder and may enclose a damping piston for reciprocation by the plunger device. The seals may be such as to permit limited leakage of liquid and may form, partly or wholly, the said passage for leakage flow. Preferably the operative connection is such that the reciprocating movement imparted to the pump becomes smaller, with increase in the main length of the suspension unit. Alternatively, or additionally, the leakage flow passage may be arranged to alter with increase in extension of the unit. The length to which the unit effectively extends in use is determined by the rate of pumping and the leakage flow. The pump may comprise a simple reciprocating piston of small diameter mounted in a pump cylinder formed within the plunger itself, the piston being spring-loaded to an outer position and projecting from the plunger at this position within the reservoir to contact a fixed stop during reciprocation of the plunger in its cylinder. The amount of contact made by the piston with the fixed stop within the cylinder may be constant or intermittent, depending on the mean length of the unit. The reservoir may form an extension from the end of the cylinder with which it is associated and may carry a lug or other securing means by which the unit is secured in position at that end. At the opposite end the projecting portion of the plunger device carries a lug, or the like, for securing in its operative position. The plunger device preferably carries a piston which is an accurate slide fit within the cylinder and which is adapted to permit restricted flow of the liquid from one side to the other during reciprocation of the plunger device within the cylinder, thus damping reciprocation of the plunger device. This damping piston may include a piston ring located in a groove around its periphery, this groove having limited movement in the groove in the axial sense to adjust liquid flow restriction around or through the piston according to direction of movement of the plunger device. The two seals may each of the labyrinth type. A spring device is preferably provided for engagement between the plunger device and the cylinder when the suspension unit has collapsed to its minimum length to permit of reciprocatory motion of the plunger device during initial movement of the vehicle, thus to ensure pumping action at the minimum length of the suspension unit.

One example of the invention intended for use on a motor vehicle as the shock absorber and vibration damper, is shown in the drawing, which is an axial sectional view. By this device one ground engaging wheel is attached to the vehicle, means being provided, such for example as a quadrilateral linkage (not shown) by which the wheel is mounted on the vehicle for guided vertical movement relative to the vehicle. In the case of a quadrilateral linkage the suspension unit to be described would be connected diagonally of the linkage so as to shorten as the wheel rises relatively to the vehicle.

The unit comprises a cylinder 1 having upper and lower labyrinth seals 2 and 3 through which a plunger device 4 extends, being a close fit within the seals. Each seal comprises an accurately machined bore having a plurality of grooves formed therein. The two seals are of different diameters, the upper seal 2 being of a slightly larger diameter than the lower seal 3. The plunger device 4 is accordingly made to have upper and lower parts 5 and 6 which fit accurately within the seals 2 and 3. At the lower end of the cylinder 1 adjacent to the seal 3 a spigot 7 is formed onto which a cylindrical reservoir 8 is secured by welding, brazing or in some other suitable manner. The reservoir 8 is of such length as to accommodate the maximum length of part 6 of the plunger device 4 that might project from the lower end of cylinder 1. The lower end of the reservoir 8 is closed by a cap 9 which is welded, brazed or otherwise secured in position. Centrally of the cap a screw threaded plug 11 is screwed into position and forms the liquid filling opening of the whole suspension unit. From the plug 11 a lug 12 extends by which the unit is mounted at its lower position, for example, by means of the rubber mounting washers 13.

A bore 14 is formed in the lower part 6 of the plunger device and into this bore a pump cylinder 15 is inserted, being retained by a hollow sleeve 16 and a retaining screw 17. At the upper end of the pump cylinder a high pressure charging valve unit 18 is located, whose function is to allow passage of high pressure liquid from the pump cylinder into the cylinder 1, but to prevent return flow. In effect this valve comprises a metallic disc 19 having an integral stem 21 facing towards the passage 22 extending from the pump cylinder 15, and a sleeve of rubber 23 surrounding the stem 21 to seat against shoulder 24. The spring 25 acts against the disc to urge the stem 21 and rubber sleeve 23 against shoulder 24. A plunger 26 extends from the cylinder 15 through a bearing recess formed within the nut 17 and terminates at its lower end at impact pad 27. The plunger 26 includes an axially extending bore 28 which communicates at its lower end through transverse bore 29 with the liquid contained within reservoir 8. At its upper end the bore 28 is provided with a ball valve 31 which acts to allow flow of liquid from bore 26 into the cylinder 15 but prevents return flow of liquid from the cylinder. A flange 32 is formed on the plunger 26 to form a seat for a compression spring 33 which surrounds the plunger within the sleeve 16. The spring acts between the flange 32 and the lower end of the cylinder insert 15, to urge the plunger 26 downwardly so that the flange 32 contacts the screw threaded insert 17. Reciprocatory motion applied to the impact pad 27 causes liquid to be drawn through the passage 26 into the cylinder 15 and to be pumped from there under high pressure through charging valve 18 into the cylinder 1. A transverse passage 34 in the lower part 6 of the plunger device facilitates entry of liquid into the cylinder 1. The impact pad 27 is arranged to strike the upper surface of the screw plug 11 when the whole plunger device 4 is depressed relative to cylinder 1.

A piston 35 is secured to the plunger device 4 at the junction between the upper and lower parts 5 and 6. A peripheral groove 37 is provided around the piston in which a piston ring 38 is located to engage the cylinder 1 and to be capable of a small amount of axial floating movement within groove 37. A number of small orifices 39 extend from the upper surfaces of piston 35 to the groove 37 while a plurality of considerably larger orifices 41 extend from the lower side of the piston into the groove 37. The piston has a small clearance 42 from the cylinder 1. During upward movement of the piston 35, ring 38 seats on the lower surface of groove 37 allowing comparatively free flow of liquid around the edges of the piston over ring 38 into the groove 37 and to the lower side through the large orifices 41. During downward movement of the piston 35 the ring seats as shown against the upper surface of groove 37 to prevent passage of liquid between the ring and the said upper surface of the groove, so that oil must pass through the small orifices 39, thus considerably dampening downward movement of the piston. On the upper side of piston 35 around the upper part 5 of the plunger, a rubber ring 43 is located to form a resilient stop to upward movement of the plunger device 4.

Around the upper seal 2 a spigot 44 is provided onto which is secured a cylindrical metal container 45 within which a rubber wiping ring 46 is provided. From the container 45 a pipe 47 extends externally of the cylinder 1 into the upper end of the reservoir 8. Leakage liquid passing through the seal 2 is trapped within the container 45 by the seal 46 and escapes through the tube 47 into the reservoir 8. On the upper side of the container 45 a rubber ring 48 of substantial section is provided. This ring is adapted to engage the interior surface of the upper end of a cylindrical guard member 49 which is secured to the upper end of the upper part 5 and extends downwardly over the cylinder 1. The guard 49 prevents access of stones, grit, mud or the like, to the upper part 5 of the plunger device 4. The guard 49 is secured to the upper part 5 by any convenient means, such for example as riveting, and a lug 51 extends further upwardly from the upper part 5 for securing to the vehicle, preferably through the rubber washers 52.

When the suspension unit is in use the weight of the vehicle passes through the rubber washers 52 to the upper part 5 of plunger device 4 and is transferred into the liquid within cylinder 1 to act downwardly on the cylinder 1 by virtue of the fact that upper part 5 is of slightly larger diameter than the lower part 6 of plunger device 4. High pressures are thus created within the cylinder to the extent that resilient compression of the liquid occurs giving spring movement of the plunger device within the cylinder. The pressure created within the cylinder is quite high and, accordingly, liquid will escape at a slow rate through leakage flow passage means such as the labyrinth seals 2 and 3, alone or in conjunction with another such passage. The escaping liquid forms a lubricant within the seals which reduces wear at the seals to a minimum. Liquid escaping through the seal 2 will pass through tube 47 to the reservoir, while liquid passing through the seal 3 will enter the reservoir directly. During motion of the vehicle the road engaging wheel associated with this suspension and connected to it at 12, 13, will be continually oscillating vertically relatively to the vehicle. The piston ring 38 will act to dampen upward movement of the ground wheel relative to the vehicle but will allow free downward movement thereof. The oscillatory motion will also cause the impact pad 27 to contact plug 11 at the lowermost limits of movement of the plunger device 4, causing reciprocation of the plunger 26 within its cylinder 15 to pump liquid through a liquid supply passage wherein is the charging valve unit 18, into the cylinder 1. The suspension is self-compensating in that sufficient pumping will take place normally to compensate for the leakage through the seals 2 and 3 of the liquid under pressure within the cylinder 1. The upper and/or the lower parts of the plunger device 4 may be so shaped, as by tapering them to slightly reduce its diameter, that when the plunger device moves towards an upper mean position the leakage through the seals 2 and 3 is slightly increased. When the vehicle stops the leaks will allow the suspension unit to settle down until the resilient rubber ring 48 transmits the vehicle load directly to the cylinder 1 from the upper rubber support rings 52. In this lower position the impact pad 27 will be in contact with the plug 11. When the vehicle is again put into motion it will oscillate vertically on the rubber ring 48, thus causing the pump to pump liquid into the cylinder 1 and to raise the plunger device 4 to its operative position. The liquid used in the unit preferably has lubricating properties and a high compressibility. The fact that such liquid will also have a high temperature co-efficient to expansion is no disadvantage since there is continuous pumping and leakage during use.

In the construction of the unit as described, the cylinder 1 is made in two concentric portions, 53 and 54. The inner portion 53 is integrally formed as a forging with the lower end 55 within which the seal 3 is formed. The outer member 54 is integrally formed by forging the upper end 56 of the cylinder within which the seal 2 is formed. In assembly, to effect liquid tight sealing of the inner member 53 against the outer member 54, a rubber sealing ring 57 is located within a recess 58 around the upper end of the inner member 53 to seat against the upper end of the end cap 56. These two cylinder members are assembled one within the other before the seals 2 and 3 are accurately formed and the lower end of the outer member 54 is closed by the action of a die over the sharp edge 59 on the lower end of the inner member 53. This swaged portion is indicated at 61. Prior to the securing of the two cylinder members together, the piston 35 is located in the lower end of the inner member by means of a pair of pins 62 tightly fitting into recesses, respectively 63, at the lower end of the inner member, and 64 in the piston itself. In this way the piston is tightly located in the lower position. A screw threaded bore 65 is provided centrally of the piston for co-operation with a screw thread 66 at the junction of the upper and lower parts 5 and 6 of the plunger device 4. After the two cylinder members have been secured together by the swaging 61, the rservoir 8 and the container 45 are attached to their respective spigots by welding, or the like. The labyrinth seals 2 and 3 are then accurately machined in axial alignment. The plunger device 4, having also been accurately machined is inserted into the cylinder through the upper seal 2 and is rotated to engage the screw thread 65. The pins 62 are waisted to the extent that they will shear on the application of a pre-determined torque to the plunger device 4, such torque being so determined that it occurs when the screw threads 65 are securely locked together so that the piston is fast on the plunger device 4. Before the insertion of the pump assembly, the interior of cylinder 1 is now filled with a suitable liquid and, for this purpose, the whole unit is inverted and liquid is inserted under pressure by a special connector attachable to the screw threaded end of the bore 14. The liquid then enters the cylinder through passage 34 and any trapped air will leave the cylinder through one or other of the labyrinth seals 2 or 3. Having filled the cylinder 1 with liquid, the connector is removed from the lower part 6 of the plunger device 4 and the pump assembly comprising pump insert 15, spacer 16, plunger 26 and spring 33 are located in position by means of the screw threaded insert 17. A predetermined quantity of liquid is then poured in to the reservoir and plug 11 is screwed home. The suspension unit is then ready for use.

It will be appreciated that the illustrated example may be considerably varied within the broad scope of the invention. For example, the cylinder may be made in the more conventional fashion, in which one end is closed by an end cap after insertion of the plunger. Again the plunger itself need not necessarily be made as one piece of metal and, in fact, the upper and lower parts 5 and 6 may be separate pieces of metal secured together by an articulating joint. Again, it is within the scope of the invention to mount the pump unit in any convenient position where it may be reciprocated by reciprocation of the plunger device. In order to drain container 45 to the reservoir 8, and leakage past seal 3 to the reservoir, the suspension unit should be maintained generally upright.

I claim as my invention:

1. A suspension unit intended for disposition uprightly in use, and comprising a liquid filled pressure resisting container, a plunger device extending through the container, an upper and a lower high pressure seal, respectively, engaging the plunger where it projects from the container, and forming part of the container, the plunger device having differing cross-sectional areas at the two seals so that longitudinal movement of the plunger within the container varies the effective volume within the container, a liquid reservoir extending from the container to enclose the lower end of the plunger device extending from the container, passage means for leakage flow from the container past at least the lower one of said seals to the reservoir, and a pump operatively connected between the plunger device and the container to pump liquid from the reservoir to the container on reciprocation of the plunger device within the container.

2. A suspension unit as claimed in claim 1, wherein the upper and lower seals form, at least in part, the passage for leakage flow from the pressure container to the reservoir, said seals being each of the labyrinth type.

3. A suspension unit intended for disposition generally uprightly in use, and comprising an upright liquid-filled container, a plunger device passing through said container and projecting therefrom at its upper and lower ends, said plunger device being of differing cross section at the respective ends, and by its movement in one axial sense effecting compression of the liquid, a high pressure seal intermediate each projecting end of the plunger device and the container, a liquid reservoir externally of the container and receiving one projecting end of the plunger device, leakage flow passage means affording restricted communication between the interior of said container and said reservoir, a liquid supply passage affording communication between the reservoir and said container, pump means arranged when operating to deliver liquid from the reservoir by way of said liquid supply passage to the container, a pump-operating element operatively connected to the pump means, an abutment positioned for engagement with said pump-operating element, one of the pump-operating elements and the abutment being mounted upon and reciprocable with the projecting end of the plunger device, and the other being fixedly positioned within the reservoir for engagement by the plunger-mounted element when reciprocated into the vicinity of a limit of its compressional movement.

4. A suspension unit as claimed in claim 3 wherein the pump comprises a pump cylinder of small diameter formed coaxially within the plunger itself, and a reciprocating piston mounted in said pump cylinder, the piston being spring loaded to an outer position and projecting from the end of the plunger at the position enclosed by the reservoir to contact a fixed stop in the reservoir during reciprocation of the plunger device in its cylinder, whereby increase in mean length of the suspension unit moves the pump piston further away from the fixed stop in the reservoir, thus reducing the reciprocation transmitted to the pump piston.

5. A suspension unit, as claimed in claim 1, wherein the container comprises a pair of cylinder members each open at one end and closed at the other end, telescoped to fit accurately one within the other to define a wholly closed pressure-resistant cylinder, the seals being formed in the two closed ends of the cylinder members.

6. A suspension unit, as claimed in claim 5, wherein an end of the outer cylinder member overlies the closed end of the inner cylinder member to secure the two cylinder members together.

7. A suspension unit intended for disposition generally uprightly in use, and comprising an upright liquid-filled container, a plunger device within said container and projecting therefrom at the upper and lower ends, said plunger device being of differing cross section at the respective ends, to effect compression of the liquid by its movement in one axial sense, a high pressure seal intermediate each end of the plunger device and the container, a liquid reservoir externally of the container, receiving one projecting end of the plunger device, leakage flow passage means affording restricted communication between the interior of said container and said reservoir, a liquid supply passage formed in the end of the plunger device which projects within the reservoir, pump means also carried by said projecting end and arranged when operating to deliver liquid by way of said liquid supply passage from the reservoir to the container, a pump-operating element projecting from the same end of the plunger and operatively connected to the pump means to actuate the latter, and an abutment positioned within said reservoir for engagement with said pump-operating element, to actuate the pump, by reciprocation of the plunger device into the vicinity of a limit of its compressional movement.

References Cited in the file of this patent

UNITED STATES PATENTS

| | | |
|---|---|---|
| 1,179,253 | Westinghouse | Apr. 11, 1916 |
| 1,289,082 | Bangs | Dec. 31, 1918 |
| 2,946,582 | Martin | July 26, 1960 |